United States Patent
Weng et al.

(10) Patent No.: US 11,582,156 B2
(45) Date of Patent: Feb. 14, 2023

(54) TRAFFIC DETECTION METHOD, APPARATUS, AND SYSTEM

(71) Applicant: Huawei Technologies Co., Ltd., Shenzhen (CN)

(72) Inventors: Cairen Weng, Nanjing (CN); Tianran Zhou, Beijing (CN); Haifeng Wu, Nanjing (CN); Dachao Yang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/324,943

(22) Filed: May 19, 2021

(65) Prior Publication Data

US 2021/0367894 A1 Nov. 25, 2021

(30) Foreign Application Priority Data

May 20, 2020 (CN) .......................... 202010432207.1

(51) Int. Cl.
| | |
|---|---|
| *H04L 47/2425* | (2022.01) |
| *H04L 43/0829* | (2022.01) |
| *H04L 43/12* | (2022.01) |
| *H04L 47/28* | (2022.01) |

(52) U.S. Cl.
CPC ...... *H04L 47/2433* (2013.01); *H04L 43/0829* (2013.01); *H04L 43/12* (2013.01); *H04L 47/28* (2013.01)

(58) Field of Classification Search
CPC . H04L 47/2433; H04L 43/0829; H04L 43/12; H04L 47/28
See application file for complete search history.

(56) References Cited

U.S. PATENT DOCUMENTS

| | | | |
|---|---|---|---|
| 8,477,653 | B2 | 7/2013 | Westerberg et al. |
| 10,270,690 | B2 | 4/2019 | Pignataro et al. |
| 2009/0245103 | A1 | 10/2009 | Miyazaki |
| 2011/0222432 | A1* | 9/2011 | Westerberg ............. H04L 43/04 370/253 |
| 2019/0109776 | A1* | 4/2019 | Li ........................ H04L 41/0895 |

(Continued)

FOREIGN PATENT DOCUMENTS

| | | |
|---|---|---|
| CN | 101764750 A | 6/2010 |
| CN | 101808016 A | 8/2010 |
| CN | 106603322 A | 4/2017 |

(Continued)

*Primary Examiner* — Siming Liu
(74) *Attorney, Agent, or Firm* — Leydig, Voit & Mayer, Ltd.

(57) ABSTRACT

A traffic detection method, apparatus, and system are provided. A first network device obtains a packet, where the packet is any packet of the traffic. The first network device adds a detection flag and detection indication information to the packet to update the packet, where the detection flag is used to indicate a position of the detection indication information, where the detection indication information includes a first flag, and the first flag is used to indicate whether the traffic is to-be-detected traffic. The first network device sends an updated packet to a second network device. According to this method, traffic performance is detected, and flexibility and extensiveness of traffic performance detection are improved.

15 Claims, 10 Drawing Sheets

(56) References Cited

U.S. PATENT DOCUMENTS

2020/0099599 A1   3/2020  Yuan et al.

FOREIGN PATENT DOCUMENTS

| | | |
|---|---|---|
| CN | 109525451 A | 3/2019 |
| CN | 110572293 A | 12/2019 |
| EP | 3457631 A1 | 3/2019 |
| JP | 2001333092 A | 11/2001 |
| JP | 2003110620 A | 4/2003 |
| JP | 2008182433 A | 8/2008 |
| JP | 2014090367 A | 5/2014 |
| JP | 2016525815 A | 8/2016 |
| JP | 2017504246 A | 2/2017 |
| WO | 2007033542 A1 | 3/2007 |

* cited by examiner

TRAFFIC DETECTION METHOD, APPARATUS, AND SYSTEM

CROSS-REFERENCE TO RELATED APPLICATION

This application claims priority to Chinese Patent Application No. 202010432207.1, filed on May 20, 2020, which is hereby incorporated by reference in its entirety.

TECHNICAL FIELD

Embodiments of this application relate to the communications field, and in particular, to a traffic detection method, apparatus, and system.

BACKGROUND

Communication faults often occur on campus networks, resulting in poor user experience. For example, users in a voice call or a video conference encounter a transient unclear voice session or video conference frame freezing. Fault detection is difficult because a fault time is short and fault reproduction is almost impossible.

A current solution is to locate a fault on a traffic transmission path through traffic detection. A network device obtains one piece of traffic. When determining that the traffic is to-be-detected traffic, the network device may collect a quantity of sent packets and a quantity of received packets of the traffic, and a sending timestamp and a receiving timestamp of each packet based on a packet detection flag such as a packet loss detection dye flag and a delay measurement dye flag. Then, the network device subtracts the quantity of sent packets from the quantity of received packets of the traffic to obtain a quantity of lost packets of the traffic on the device, and uses a difference between the receiving timestamp and the sending timestamp of the packet as a delay of the traffic on the device.

However, the current traffic detection solution may provide limited detection information. For example, only loss and delay measurement information can be detected. Alternatively, although another type of detection information may be provided by adding a detection header to a packet, the detection header needs to be encapsulated in a fixed position of the packet. Consequently, performance detection can be performed only in packet transmission processes of part of related encapsulation protocols such as multi-protocol label switching (MPLS) and internet protocol version 6 (IPV6) encapsulation protocols. Therefore, in the existing traffic detection solution, a position for adding a detection header is limited, an application scope is limited, and detection information is not rich.

SUMMARY

This application provides a traffic detection method, apparatus, and system, to detect performance information of traffic and improve flexibility and extensiveness of traffic performance detection.

To achieve the foregoing objective, the following technical solutions are used in this application.

According to a first aspect, this application provides a traffic detection method. The method is performed by a first network device. The method may include: obtaining a packet, where the packet is any packet of the traffic; adding a detection flag and detection indication information to the packet to update the packet, where the detection flag is used to indicate a position of the detection indication information, the detection indication information includes a first flag, and the first flag is used to indicate whether the traffic is to-be-detected traffic; and sending an updated packet to a second network device.

According to the traffic detection method provided in this application, when performance information of the traffic is detected, the detection flag and the detection indication information are added to the packet of the traffic, and the position of the detection indication information is specifically indicated by using the detection flag. Therefore, the detection indication information is added to any position segment (for example, the any position segment may be a packet header segment, a payload segment, or a segment between a packet header and a payload) in the packet. This improves flexibility and extensiveness of traffic performance detection.

With reference to the first aspect, in a possible implementation, the detection flag may specify a position relationship between the detection flag and the detection indication information by using a transmission protocol. Specifically, the detection flag indicates the position of the detection indication information by using the position relationship and a plurality of bits representing one digital identifier.

In a possible implementation, the position relationship between the detection flag and the detection indication information may be an adjacent relationship.

In another possible implementation, the position relationship between the detection flag and the detection indication information may be a nonadjacent relationship. In this case, after finding the detection flag, the second network device that receives the packet can still determine a start position of the detection indication information according to a preset rule.

With reference to the first aspect or any one of the foregoing possible implementations, in another possible implementation, an identifier value of the identifier represented by the plurality of bits may directly indicate the position of the detection indication information. For example, a user numbers a possible storage position of the detection indication information in advance, and sets the identifier represented by the plurality of bits as a position number of the detection indication information to indicate the position of the detection indication information.

The user may configure, based on an actual requirement, a position to which the detection flag and the detection indication information are added in the packet. This is not uniquely limited in this application.

With reference to the first aspect or any one of the foregoing possible implementations, in another possible implementation, the first network device may add the detection flag and the detection indication information to a payload part of the packet.

With reference to the first aspect or any one of the foregoing possible implementations, in another possible implementation, the first network device may add the detection flag and the detection indication information to a packet header part of the packet.

With reference to the first aspect or any one of the foregoing possible implementations, in another possible implementation, the first network device may add the detection flag to a payload part of the packet, and add the detection indication information to a packet header part of the packet.

With reference to the first aspect or any one of the foregoing possible implementations, in another possible implementation, the first network device may add the detection flag to a packet header part of the packet, and add the detection indication information to a payload part of the packet.

With reference to the first aspect or any one of the foregoing possible implementations, in another possible implementation, the adding a detection flag and detection indication information to the packet to update the packet may include: determining, based on an access control list, that the traffic is to-be-detected traffic; and adding the detection flag and the detection indication information to the packet, where the first flag in the detection indication information is a first value. In this possible implementation, when it is determined that the traffic is to-be-detected traffic, the detection flag and the detection indication information are added, and the first flag in the detection indication information is set to the first value. This avoids misdetermining, by adding only information about the detection flag, that the traffic is to-be-detected traffic, and improves accuracy of traffic performance detection.

Specifically, the first flag may be one or more bits. When the one or more bits are the first value, it indicates that the traffic to which the packet including the first flag belongs is to-be-detected traffic. When the one or more bits are a second value, it indicates that the traffic to which the packet including the first flag belongs is not to-be-detected traffic.

A quantity of bits in the first flag, the first value, and the second value are not specifically limited in this application.

With reference to the first aspect or any one of the foregoing possible implementations, in another possible implementation, the detection indication information may further include at least one of the following: a second flag used to indicate to collect packet quantity information of the traffic, and a third flag used to indicate to collect timestamp information of the packet. In this possible implementation, the second flag and/or the third flag are/is configured in the detection indication information. By properly configuring the second flag and the third flag, flexible performance data detection can be implemented.

With reference to the first aspect or any one of the foregoing possible implementations, in another possible implementation, the detection indication information may further include a priority flag, and the priority flag is used to indicate a detection priority of the traffic. In this possible implementation, the priority flag in the detection indication information may be configured based on an actual situation. During subsequent processing, the network device may preferably detect traffic with a high priority, so as to avoid a case in which performance detection cannot be performed on traffic with a high priority when a flow table capacity is insufficient.

A form and content of the priority flag are not uniquely limited in this application.

For example, the priority flag may be one or more bits representing one digital identifier. A detection priority of to-be-detected traffic is indicated by using a relationship between the digital identifiers.

With reference to the first aspect or any one of the foregoing possible implementations, in another possible implementation, the detection indication information may further include a backward flow flag and a tuple flag, where the backward flow flag is used to indicate whether to detect a backward flow, and the tuple flag is used to indicate to detect a backward flow that meets one or more tuple entries. In this possible implementation, the backward flow flag and the tuple flag in the detection indication information may be flexibly configured based on an actual situation. During subsequent processing, the network device may determine, based on the indication of the backward flow flag in the detection indication information, whether to detect the backward flow, and may determine, based on the one or more tuple entries indicated by the tuple flag, the backward flow that needs to be detected, to implement flexible detection on the backward flow.

Forms and content of the backward flow flag and the tuple flag are not uniquely limited in this application.

For example, the backward flow flag may be configured as one or more bits. When the one or more bits are set to a fifth value, it indicates to detect the backward flow. When the one or more bits are set to a sixth value, it indicates not to detect the backward flow.

With reference to the first aspect or any one of the foregoing possible implementations, in another possible implementation, the tuple flag may include a plurality of flag bits, the plurality of flag bits are in a one-to-one correspondence with a plurality of tuple entries, and one or more flag bits that are set in the plurality of flag bits are used to indicate the one or more tuple entries that the to-be-detected backward flow meets.

The one or more flag bits that are set may be set to 1 or 0.

With reference to the first aspect or any one of the foregoing possible implementations, in another possible implementation, the detection indication information may further include a packet loss cause report flag, and the packet loss cause report flag is used to indicate whether to report a packet loss cause. In this possible implementation, the user may configure the packet loss cause report flag based on an actual requirement, to flexibly report the packet loss cause. This provides more abundant traffic detection information, and helps analyze and determine the packet loss cause.

Forms and content of the packet loss cause report flag are not uniquely limited in this application.

For example, the packet loss cause report flag may be one or more bits. When the one or more bits are a seventh value, it indicates to report the packet loss cause. When the one or more bits are an eighth value, it indicates not to report the packet loss cause.

The user may configure a quantity of bits of the packet loss cause report flag based on an actual requirement, and configure the seventh value and the eighth value based on an actual requirement. This is not limited in this application.

It should be noted that the user may configure the detection indication information based on an actual requirement of the user. This is not listed one by one. Detection indication information including different content is configured, so that richness of traffic performance detection is improved.

With reference to the first aspect or any one of the foregoing possible implementations, in another possible implementation, the adding a detection flag and detection indication information to the packet to update the packet includes: determining, based on an access control list, that the traffic is not to-be-detected traffic; and adding the detection flag and the detection indication information to the packet, where the first flag in the detection indication information is a second value. In this possible implementation, when it is determined that the traffic is not to-be-detected traffic, the detection flag and the detection indication information are added, and the first flag in the detection indication information is the second value. This avoids misdetermining, by using only the detection flag, that the traffic is not to-be-detected traffic, and improves accuracy of traffic performance detection.

With reference to the first aspect or any one of the foregoing possible implementations, in another possible implementation, the first network device collects performance data of the traffic on the first network device.

The performance data includes at least one of the following data: the packet quantity information of the first traffic collected based on the second flag, and the timestamp information of the first packet collected based on the third flag.

According to a second aspect, this application provides another traffic detection method. The method is performed by a second network device. The method may include: receiving a first packet from a first network device, where the first packet is any packet of first traffic; determining that the first packet includes a detection flag and determining that a first flag in first detection indication information that is after the detection flag indicates that the first traffic is to-be-detected traffic; and collecting performance data of the first traffic on the second network device based on the first detection indication information, where a value of the first flag in the first detection indication information is a first value.

According to the traffic detection method provided in this application, when performance information of the traffic is detected, the detection flag and detection indication information are found in the packet of the traffic, and the position of the detection indication information is specifically indicated by using the detection flag. Therefore, the detection indication information is found in any position segment (for example, the any position segment may be a packet header segment, a payload segment, or a segment between a packet header and a payload) in the packet. This improves flexibility and extensiveness of traffic performance detection.

With reference to the second aspect, in a possible implementation, the first detection indication information may include at least one of the following: a second flag used to indicate to collect packet quantity information of the first traffic, and a third flag used to indicate to collect timestamp information of the first packet. The performance data includes at least one of the following data: the packet quantity information of the first traffic collected based on the second flag, and the timestamp information of the first packet collected based on the third flag. In this possible implementation, by detecting the second flag and the third flag in the detection indication information, flexible performance data detection can be implemented.

With reference to the second aspect or any one of the foregoing possible implementations, in another possible implementation, the first detection indication information may further include a priority flag, and the priority flag is used to indicate a detection priority of the first traffic. In this possible implementation, by searching for the priority flag in the detection indication information, traffic with a high priority may be preferably processed, so as to avoid a case in which performance detection cannot be performed on traffic with a high priority when a flow table capacity is insufficient.

With reference to the second aspect or any one of the foregoing possible implementations, in another possible implementation, the first detection indication information may further include a backward flow flag and a tuple flag, where the backward flow flag is used to indicate whether to detect a backward flow, and the tuple flag is used to indicate to detect a backward flow that meets one or more tuple entries. The method further includes: determining that the backward flow flag in the first detection indication information indicates to detect the backward flow; obtaining, from the first packet, the one or more tuple entries indicated by the tuple flag; and determining a to-be-detected first backward flow based on the one or more tuple entries. In this possible implementation, by searching for the backward flow flag and the tuple flag in the detection indication information, whether to detect the backward flow may be determined based on an indication of the backward flow flag in the detection indication information, and the backward flow that needs to be detected may be determined based on the one or more tuple entries indicated by the tuple flag, so as to implement flexible detection on the backward flow.

With reference to the second aspect or any one of the foregoing possible implementations, in another possible implementation, the tuple flag may include a plurality of flag bits, the plurality of flag bits are in a one-to-one correspondence with a plurality of tuple entries, and one or more flag bits that are set in the plurality of flag bits are used to indicate the one or more tuple entries that the to-be-detected backward flow meets. The obtaining, from the first packet, the one or more tuple entries indicated by the tuple flag includes: obtaining, based on the one or more flag bits that are set in the plurality of flag bits, the one or more tuple entries that the to-be-detected first backward flow meets.

With reference to the second aspect or any one of the foregoing possible implementations, in another possible implementation, after the collecting performance data of the first traffic on the second network device, the method may further include: sending the performance data to a centralized processing device. In this possible implementation, the performance data collected by the second network device is sent to the centralized processing unit, and the centralized processing unit performs related calculation based on the sent performance data, to implement fault demarcation and detection.

With reference to the second aspect or any one of the foregoing possible implementations, in another possible implementation, the method may further include: obtaining a packet loss cause of the first traffic, and sending the packet loss cause to the centralized processing device. In this possible implementation, the packet loss cause is flexibly reported by searching for the packet loss cause report flag in the detection indication information.

With reference to the second aspect or any one of the foregoing possible implementations, in another possible implementation, the method may further include: receiving a second packet from the first network device, where the second packet is any packet of second traffic; determining that the second packet includes the detection flag and determining that the first flag in second detection indication information that is after the detection flag indicates that the second traffic is not to-be-detected traffic; not collecting performance data; and forwarding the second packet to a third network device, where a value of the first flag in the second detection indication information is a second value. In this possible implementation, by searching for that the first flag in the detection indication information is the second value, it is determined that the traffic is not to-be-detected traffic. This avoids misdetermining, by adding only information about the detection flag, that the traffic is not to-be-detected traffic, and improves accuracy of traffic performance detection.

According to a third aspect, this application further provides a traffic detection apparatus. The apparatus may be a first network device, or the apparatus may be deployed on a first network device. The apparatus may include: an obtaining unit, an adding unit, and a sending unit.

The obtaining unit is configured to obtain a packet. The packet is any packet of the traffic.

The adding unit is configured to add a detection flag and detection indication information to the packet obtained by the obtaining unit, to update the packet. The detection flag is used to indicate a position of the detection indication information. The detection indication information includes a first flag. The first flag is used to indicate whether the traffic is to-be-detected traffic.

The sending unit is configured to send an updated packet updated by the adding unit to a second network device.

It should be noted that the traffic detection apparatus provided in the third aspect is configured to perform the traffic detection method according to the first aspect. For specific implementation, refer to the specific implementation of the first aspect.

According to a fourth aspect, this application provides a traffic detection apparatus. The apparatus may be a second network device, or the apparatus may be deployed on a second network device. The apparatus may include: a receiving unit and a processing unit.

The receiving unit is configured to receive a first packet from a first network device, where the first packet is any packet of first traffic.

The processing unit is configured to: determine that the first packet received by the receiving unit includes a detection flag and determine that a first flag in first detection indication information that is after the detection flag indicates that the first traffic is to-be-detected traffic; and collect performance data of the first traffic on the second network device based on the first detection indication information, where a value of the first flag in the first detection indication information is a first value.

It should be noted that the traffic detection apparatus provided in the fourth aspect is configured to perform the traffic detection method according to the second aspect. For specific implementation, refer to the specific implementation of the second aspect.

According to a fifth aspect, an embodiment of this application provides a first network device. The device may include a processor, configured to implement the traffic detection method according to the first aspect. The device may further include a memory. The memory is coupled to the processor. When executing instructions stored in the memory, the processor may implement the traffic detection method according to the first aspect. The device may further include a communications interface. The communications interface is used by the apparatus to communicate with another device. For example, the communications interface may be a transceiver, a circuit, a bus, a module, or a communications interface of another type. In a possible implementation, the device may include:

a memory, configured to store instructions; and a processor, configured to: obtain a packet, where the packet is any packet of the traffic; add a detection flag and detection indication information to the packet to update the packet, where the detection flag is used to indicate a position of the detection indication information, the detection indication information includes a first flag, and the first flag is used to indicate whether the traffic is to-be-detected traffic; and send an updated packet to a second network device.

It should be noted that the instructions in the memory in this application may be pre-stored, or may be downloaded from the interne and then stored when the apparatus is used. Sources of the instructions in the memory are not specifically limited in this application. The coupling in this embodiment of this application is indirect coupling or connection between apparatuses, units, or modules for information exchange between the apparatuses, the units, or the modules, and may be in electrical, mechanical, or other forms.

According to a sixth aspect, an embodiment of this application provides a second network device. The device may include a processor, configured to implement the traffic detection method according to the second aspect. The device may further include a memory. The memory is coupled to the processor. When executing instructions stored in the memory, the processor may implement the traffic detection method according to the second aspect. The device may further include a communications interface. The communications interface is used by the apparatus to communicate with another device. For example, the communications interface may be a transceiver, a circuit, a bus, a module, or a communications interface of another type. In a possible implementation, the device includes:

a memory, configured to store instructions; and a processor, configured to: receive a first packet from a first network device, where the first packet is any packet of first traffic; determine that the first packet includes a detection flag and determine that a first flag in first detection indication information that is after the detection flag indicates that the first traffic is to-be-detected traffic; and collect performance data of the first traffic on the second network device based on the first detection indication information, where a value of the first flag in the first detection indication information is a first value.

It should be noted that the instructions in the memory in this application may be pre-stored, or may be downloaded from the interne and then stored when the apparatus is used. Sources of the instructions in the memory are not specifically limited in this application. The coupling in this embodiment of this application is indirect coupling or connection between apparatuses, units, or modules for information exchange between the apparatuses, the units, or the modules, and may be in electrical, mechanical, or other forms.

According to a seventh aspect, a traffic detection system is provided. The detection system includes a first traffic detection apparatus and one or more second traffic detection apparatuses. The first traffic detection apparatus may be the apparatus according to the third aspect or any possible implementation of the third aspect, and the second traffic detection apparatus may be the apparatus according to the fourth aspect or any possible implementation of the fourth aspect.

According to an eighth aspect, a traffic detection system is provided. The detection system includes a first network device and one or more second network devices. The first network device may be the apparatus according to the fifth aspect or any possible implementation of the fifth aspect, and the second network device may be the apparatus according to the sixth aspect or any possible implementation of the sixth aspect.

According to a ninth aspect, an embodiment of this application further provides a computer-readable storage medium, including instructions. When the instructions are run on a computer, the computer is enabled to perform the traffic detection method according to any one of the foregoing aspects or any one of the foregoing possible implementations.

According to a tenth aspect, an embodiment of this application further provides a computer program product. When the computer program product is run on a computer, the computer is enabled to perform the traffic detection method according to any one of the foregoing aspects or any one of the foregoing possible implementations.

According to an eleventh aspect, an embodiment of this application provides a chip system. The chip system includes a processor, may further include a memory, and is configured to implement functions implemented by the first network device in the foregoing method. The chip system may include a chip, or may include a chip and another discrete component.

According to a twelfth aspect, an embodiment of this application provides a chip system. The chip system includes a processor, may further include a memory, and is configured to implement functions implemented by the second network device in the foregoing method. The chip system may include a chip, or may include a chip and another discrete component.

Schemes provided in the third aspect to the twelfth aspect are used to implement the traffic detection methods according to the first aspect to the second aspect, and therefore can achieve same beneficial effects as the first aspect to the second aspect. Details are not described herein again.

It should be noted that, various possible implementations of any one of the foregoing aspects may be combined on a premise that the solutions are not contradictory.

DESCRIPTION OF EMBODIMENTS

Figure 1:
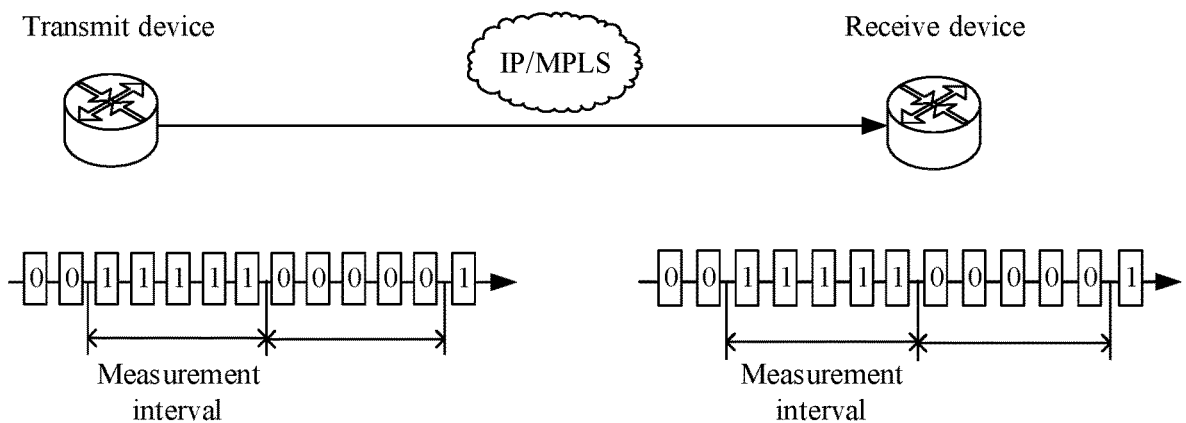
FIG. 1 is a schematic diagram of a traffic packet loss detection scenario according to this application.

In this specification, claims, and accompanying drawings of this application, the terms "first", "second", "third", and the like are intended to distinguish between different objects but do not limit a particular order.

In the embodiments of this application, the word such as "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word such as "example" or "for example" is intended to present a relative concept in a specific manner for ease of understanding.

In the descriptions of this application, "/" represents an "or" relationship between associated objects unless otherwise specified. For example, A/B may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, in the descriptions of this application, "a plurality of" means two or more than two unless otherwise specified, and "at least one of the following items (pieces)" or a similar expression thereof means any combination of the items, and includes any combination of one item (piece) or a plurality of items (pieces). For example, at least one of a, b, or c may indicate: a, b, c, a-b, a-c, b-c, or a-b-c, where a, b, and c may be singular or plural.

In the embodiments of this application, "at least one" may also be one or more, and "a plurality of" may be two, three, four, or more. This is not limited in this application.

For ease of understanding, technical terms in this application are explained first.

A packet is an exchanged and transmitted data unit in a network. One packet may include a packet header part and a data payload part. The packet header part may be used to specify a data transmission rule, and the data payload part may be used to carry data. Based on different function types, packets may be classified into a data packet, a service control packet, and the like. A type of the packet is not specifically limited in the embodiments of this application. For example, the packet in this application may be a data packet or a service control packet.

A package, also referred to as a data package, is a data unit including complete data information during network communication. Usually, one package may be one packet. In some special scenarios, for example, in a fragmentation scenario, one package may include one or more packets. It should be understood that there is a conversion relationship between a quantity of packages and a quantity of packets of traffic, in other words, the quantity of packages may be obtained when the quantity of packets is learned of, and vice versa.

A flag may be a field used to indicate a specific function in the packet. The flag may be one or more bits. The flag bit may be set to different values to indicate different meanings. The flag may alternatively be a digital identifier including a plurality of bits, and a user-defined function may be represented by using the digital identifier including a plurality of bits.

Traffic refers to one or more packets that have same tuple information. The traffic may be divided based on a service. For example, packets that have same tuple information and belong to a same service may be used as one piece of traffic. Alternatively, the traffic may be divided based on a time interval. For example, packets that have same tuple information and belong to a fixed time interval may be used as one piece of traffic.

A quantity of lost packets of the traffic may be a quantity of packets of the traffic lost from a transmit device to a receive device.

A traffic delay may be a delay of a specified packet (sample packet) in the traffic or another delay. For example, in the embodiments of this application, the traffic delay may be any one of a maximum delay, a minimum delay, and an average delay of all packet delays in the traffic.

A quantity of packets of the traffic may be a quantity of sent packets and/or a quantity of received packets of the entire traffic, or may be a quantity of sent packets and/or a quantity of received packets in a time period.

A packet timestamp is used to indicate packet time information. The packet timestamp may be a sending timestamp indicating a packet sending time and/or a receiving timestamp indicating a packet receiving time.

A technology provided in a current traffic detection technical solution can be used to locate a faulty device on a traffic transmission path through detection. A network device obtains one piece of traffic. When determining that the traffic is to-be-detected traffic, the network device may collect a quantity of lost packets and delay information of the traffic based on a detection flag in the packet such as a packet loss detection dye flag and a delay measurement dye flag.

As shown in FIG. 1, a transmit device communicates with a receive device through an IP/MPLS transmission protocol. A loss measurement process of traffic may be as follows:

The transmit device periodically identifies a feature bit (a loss measurement feature bit) in a packet that belongs to the traffic (sets the feature bit to 1 or resets the feature bit to 0), and divides the packet into different measurement intervals based on a feature setting attribute. A counter starts packet counting at the beginning of each measurement interval and stops counting at the end of the measurement interval to obtain a quantity of sent packets of the traffic in each measurement interval, and sends the quantity of sent packets to a centralized processing device.

The receive device also sets a same quantity of counters as the measurement intervals. The counter starts packet counting at the beginning of each measurement interval and stops counting at the end of the measurement interval to obtain a quantity of received packets of the traffic in each measurement interval, and sends the quantity of received packets to the centralized processing device.

After receiving the quantity of sent packets of the traffic in each measurement interval that are sent by the transmit device and the quantity of received packets of the traffic in each measurement interval that are sent by the receive device, the centralized processing device converts the quantities into a quantity of sent packets and a quantity of received packets, then performs synchronous identification on quantities of sent packets and quantities of received packets in different measurement intervals, and subtracts the quantity of sent packets from the quantity of received packets in one measurement interval to obtain a quantity of lost packets in the measurement interval. A sum of quantities of lost packets in different measurement intervals is a quantity of lost packets of the traffic.

Figure 2:
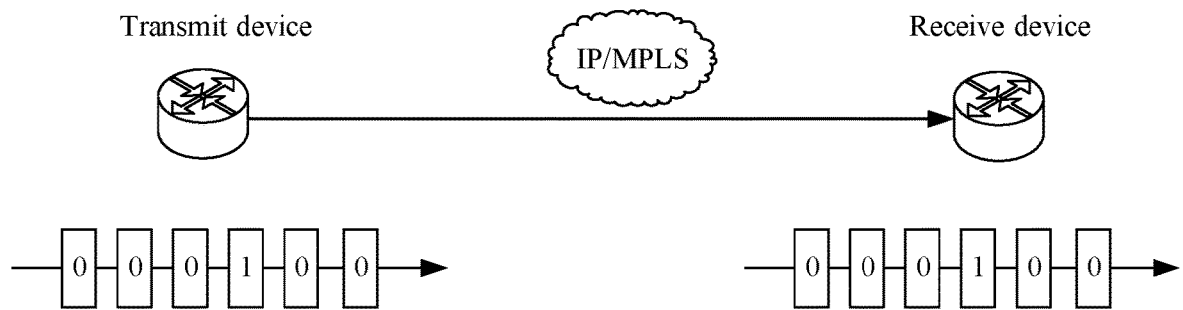
FIG. 2 is a schematic diagram of a traffic delay detection scenario according to this application.

As shown in FIG. 2, when the transmit device communicates with the receive device through the IP/MPLS transmission protocol, a delay measurement process of the traffic may be as follows:

Traffic delay measurement may be performed by using a sampling measurement method. To be specific, a packet in the traffic is first sampled to obtain a sampled packet, then a delay of the sampled packet in a network is measured, and the delay of the sampled packet is used as a traffic delay.

Specifically, the transmit device marks a feature bit (a delay detection feature bit) of the sampled packet in the traffic, for example, marks the feature bit as 1, and then forwards the marked packet. When detecting the feature bit flag, the transmit device collects a timestamp of the packet, and sends the timestamp of the packet and local information to the centralized processing device. The local information may include tuple information of a service packet header, a traffic identity document (identity document, ID), and the like.

When receiving the sampled packet, the receive device collects the timestamp of the packet based on an indication of the feature bit flag, and sends the timestamp of the packet. Time information of the packet indicated by the timestamp collected by the receive device and the timestamp collected by the transmit device are sent to the centralized processing device to calculate a difference, and the difference is referred to as the traffic delay.

However, detection information provided in the foregoing detection solution is limited, and only loss and delay measurement information can be detected. In addition, a marked feature bit may be tampered with. Therefore, another traffic detection solution may provide more secure and more types of detection information by adding a detection header to a packet. A network device obtains one piece of traffic. When determining that the traffic is to-be-detected traffic, the network device adds a detection header to a fixed position of a packet header of each packet in the traffic, and collects information such as a packet loss and a delay of the traffic based on a detection flag in the detection header. However, in this traffic detection solution, because the detection header is added to the fixed position of the packet header, performance detection can be performed only in packet transmission processes of part of related encapsulation protocol packets such as MPLS and IPV6 encapsulation protocols. Therefore, in the existing traffic performance detection solution, a position for adding a detection header is limited, an application scope is limited, and detection information is still not rich.

Based on this, the embodiments of this application provide a traffic detection method, apparatus, and system. When performance information of traffic is detected, a detection flag and detection indication information are added to a packet of the traffic, and a position of the detection indication information is specifically indicated by using the detection flag. Therefore, the detection indication information is added to any position segment (for example, the any position segment may be a packet header segment, a payload segment, or a segment between a packet header and a payload) in the packet. This improves flexibility and extensiveness of traffic performance detection.

The following describes the implementations of the embodiments of this application in detail with reference to the accompanying drawings.

Figure 3:
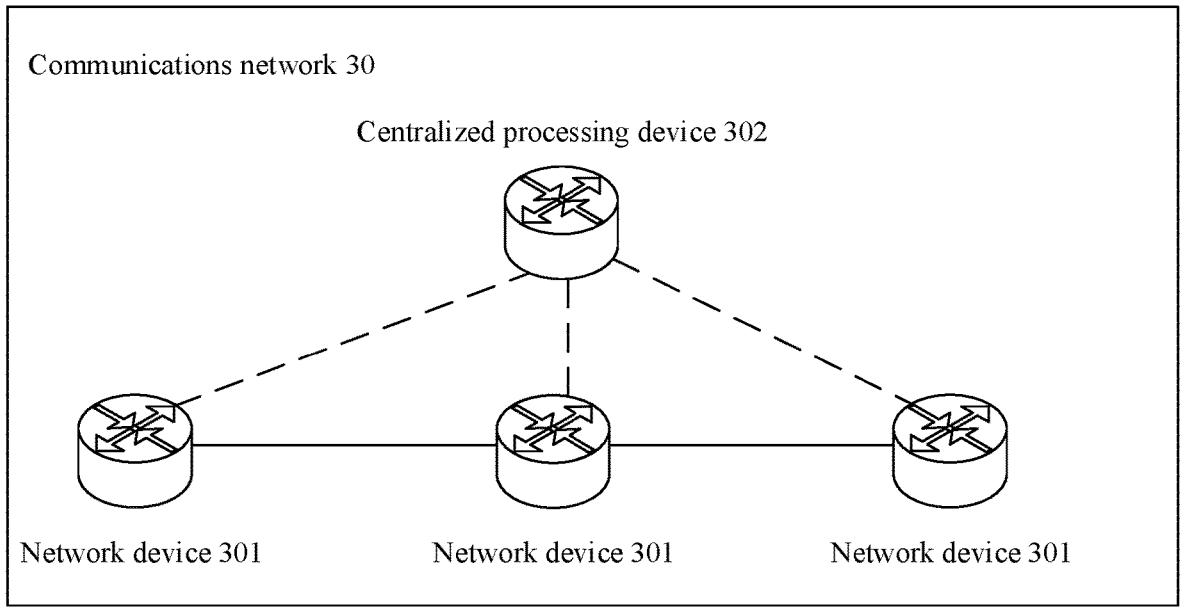
FIG. 3 is a schematic diagram of a communications network architecture according to an embodiment of this application.

The traffic detection method provided in the embodiments of this application may be applied to a communications network 30 shown in FIG. 3. The communications network 30 may also be referred to as a data network or a computer network. A type of the communications network is not specifically limited in this application. For example, the communications network 30 may be any one of the following types of networks: a campus network, a data center network, a firewall system network, a data network based on routing transmission, a 5th generation mobile communication technology (5th generation wireless systems, or "5G") bearer network, and a multicast network.

As shown in FIG. 3, the communications network 30 may include a plurality of network devices 301 (which may also be referred to as node devices, forwarding nodes, forwarding devices, or the like). The network device 301 may be a switch, a router, a server, or another network device having a packet forwarding capability. An actual product form of the network device 301 is not limited in the embodiments of this application.

Specifically, the plurality of network devices 301 are configured to transmit data.

Further, the communications network 30 may include a centralized processing device 302. The centralized processing device 302 may be a server having management and computing capabilities or a network device of another type. An actual product form of the centralized processing device 302 is not limited in the embodiments of this application.

Specifically, the centralized processing device 302 may be configured to: manage the network device 301; and process data reported by the network device 301.

Optionally, a device having a related data processing capability in the plurality of network devices 301 may also be used as the centralized processing device 302.

It should be noted that a quantity of network devices included in the communications network system 30 and a specific architecture may be configured based on an actual requirement. A scale and a specific architecture of the network system 30 are not limited in the embodiments of this application.

With reference to the accompanying drawings, the following specifically describes the traffic detection method and apparatus provided in the embodiments of this application.

Figure 4:
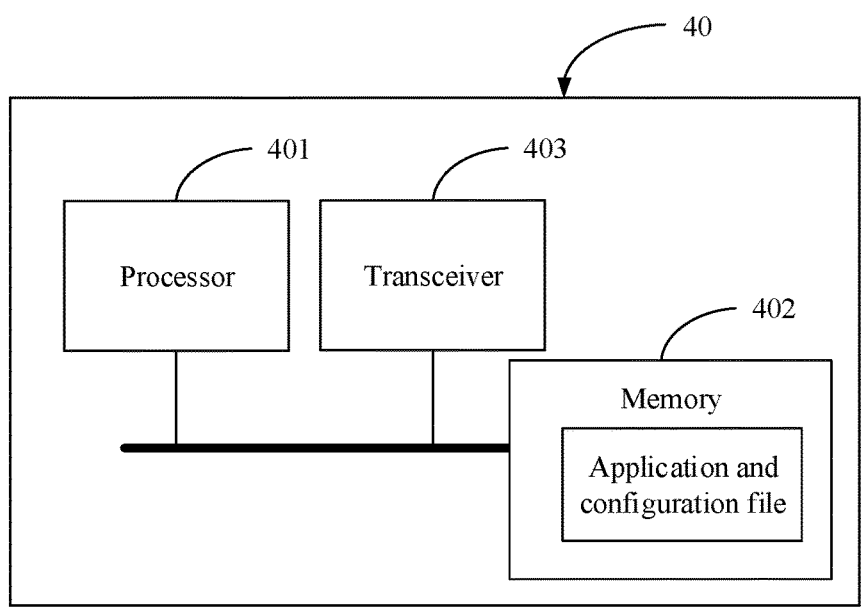
FIG. 4 is a schematic structural diagram of a network device according to an embodiment of this application.

According to one aspect, an embodiment of this application provides a network device 40, configured to perform the traffic detection method provided in this application. The network device 40 may be the network device 301. As shown in FIG. 4, the network device 40 may include a processor 401, a memory 402, and a transceiver 403.

The following describes the components of the network device 40 in detail with reference to FIG. 4.

The memory 402 may be a volatile memory such as a random access memory (RAM); or a nonvolatile memory such as a read-only memory (ROM), a flash memory, a hard disk drive (HDD), or a solid-state drive (SSD); or a combination of the foregoing types of memories. The memory 402 is configured to store program code, a configuration file, or other content that can implement the method in this application.

The processor 401 is a control center of the network device 40. For example, the processor 401 may be a central processing unit (CPU) or an application specific integrated circuit (ASIC), or may be configured as one or more integrated circuits implementing the embodiments of this application, for example, one or more digital signal processors (DSPs) or one or more field programmable gate arrays (FPGAs).

The transceiver 403 is configured to communicate with another device. The transceiver 403 may be a communications port or the like.

In a possible implementation, the processor 401 runs or executes software programs and/or modules stored in the memory 402, and invokes data stored in the memory 402, to execute the following functions:

obtaining a packet, where the packet is any packet of traffic; adding a detection flag and detection indication information to the packet to update the packet, where the detection flag is used to indicate a position of the detection indication information, the detection indication information includes a first flag, and the first flag is used to indicate whether the traffic is to-be-detected traffic; and sending an updated packet to a second network device.

In another possible implementation, the processor 401 runs or executes software programs and/or modules stored in the memory 402, and invokes data stored in the memory 402, to execute the following functions:

receiving a first packet from a first network device, where the first packet is any packet of first traffic; determining that the first packet includes a detection flag and determining that a first flag in first detection indication information that is after the detection flag indicates that the first traffic is to-be-detected traffic; and collecting performance data of the first traffic on the second network device based on the first detection indication information, where a value of the first flag in the first detection indication information is a first value.

Figure 5:
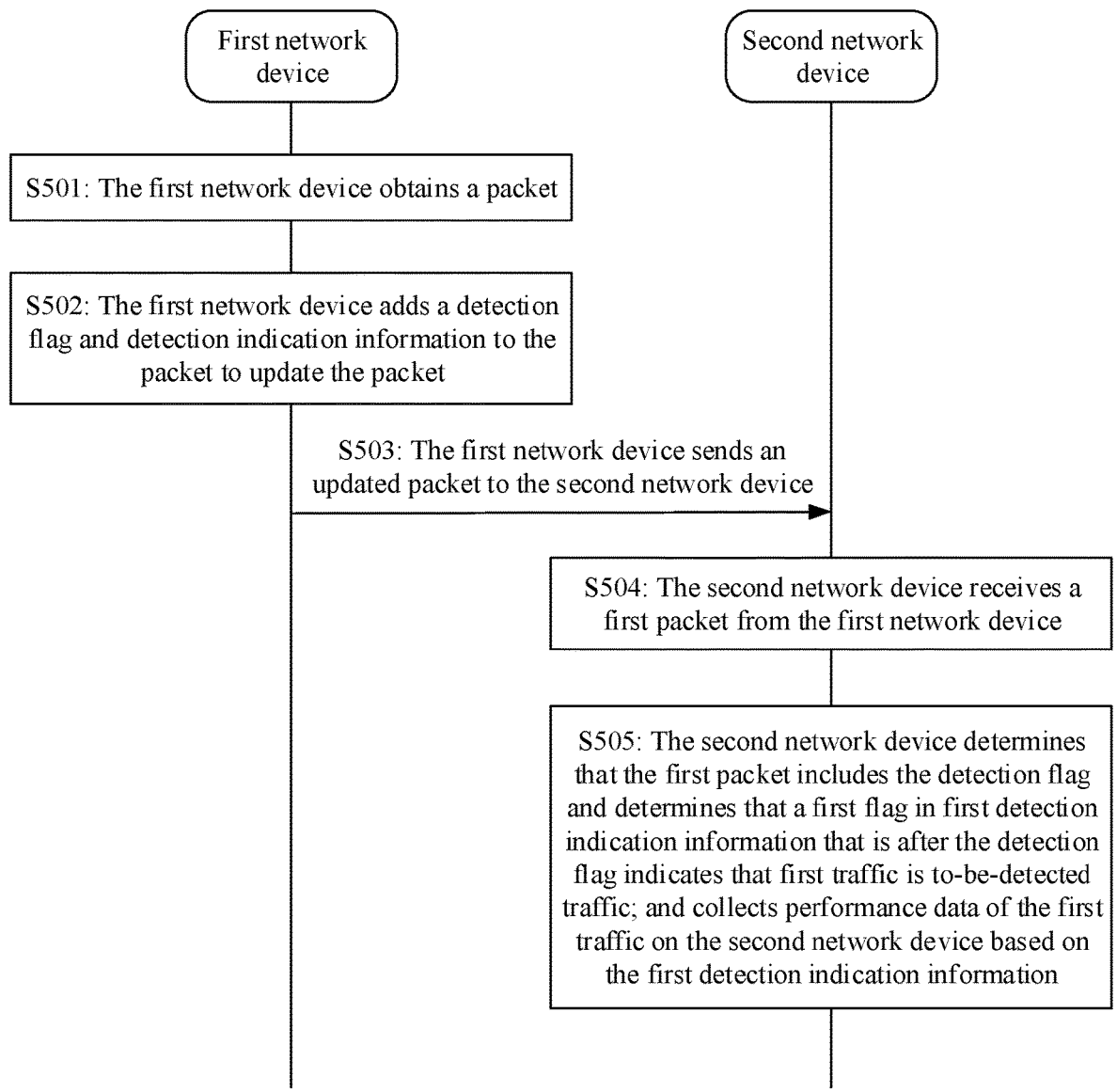
FIG. 5 is a schematic flowchart of a traffic detection method according to an embodiment of this application.

According to another aspect, an embodiment of this application provides a traffic detection method, applied to interaction between a first network device and a second network device. The first network device and the second network device each may be the network device 301. The second network device may directly communicate with the first network device, or the second network device may communicate with the first network device by using a plurality of network devices. It should be noted that the first network device or the second network device processes packets in traffic in a same manner. The following related steps are described by using an example of processing only one packet. FIG. 5 is a flowchart of a traffic detection method according to an embodiment of this application. As shown in FIG. 5, the method may include the following steps.

S501: A first network device obtains a packet.

The first network device may be a source node device on a traffic transmission path.

Specifically, S501 may be implemented as follows: First, the first network device obtains traffic of a same service or obtains traffic that has same tuple information and that belongs to a specified time interval; and then obtains one or more packets in the traffic in a predicted sequence of sending the packets in the traffic.

S502: The first network device adds a detection flag and detection indication information to the packet to update the packet.

The detection flag is used to indicate a position of the detection indication information.

A user may configure a form and content of the detection flag based on an actual situation. This is not limited in this application.

Specifically, the detection flag may be an identifier represented by a plurality of bits. For example, the detection flag may be a 64-bit identifier. The position of the detection indication information may be indicated in Manner A or Manner B.

Manner A: A position relationship between the detection flag and the detection indication information may be specified by using a transmission protocol (a preset rule). The detection flag indicates the position of the detection indication information by using the position relationship and the plurality of bits representing the digital identifier.

In a possible implementation, the position relationship between the detection flag and the detection indication information may be an adjacent relationship. For example, the transmission protocol may specify that a fixed quantity of bits before the detection flag are the detection indication information, or a fixed quantity of bits after the detection flag are the detection indication information.

The user may configure the fixed quantity of bits of the detection indication information based on an actual requirement. This is not limited in this application. For example, the detection indication information may be 160 bits.

In another possible implementation, the position relationship between the detection flag and the detection indication information may be a nonadjacent relationship. For example, the transmission protocol may specify that a fixed quantity of bits that is at a preset distance from the detection flag and that is before the detection flag are the detection indication information, or a fixed quantity of bits that is at a preset distance from the detection flag and that is after the detection flag are the detection indication information.

The preset distance may be set based on an actual requirement. This is not limited in this application. For example, the fixed distance may be 128 bits or 256 bits.

Manner B: An identifier value of the identifier represented by the plurality of bits may directly indicate the position of the detection indication information. For example, the user numbers a possible storage position of the detection indication information in advance, and sets the identifier value of the identifier represented by the plurality of bits as a position number of the detection indication information to indicate the position of the detection indication information.

The user may configure, based on an actual requirement, a position to which the detection flag and the detection indication information are added in the packet. This is not uniquely limited in this application. For example, the user may determine, based on different encapsulation formats of the packet, the position to which the detection flag and the detection indication information are added in the packet.

Specifically, the position to which the detection flag and the detection indication information are added may include but is not limited to the following implementation 1 to implementation 4.

Implementation 1: The detection flag and the detection indication information are added to a payload part of the packet.

Figure 6:
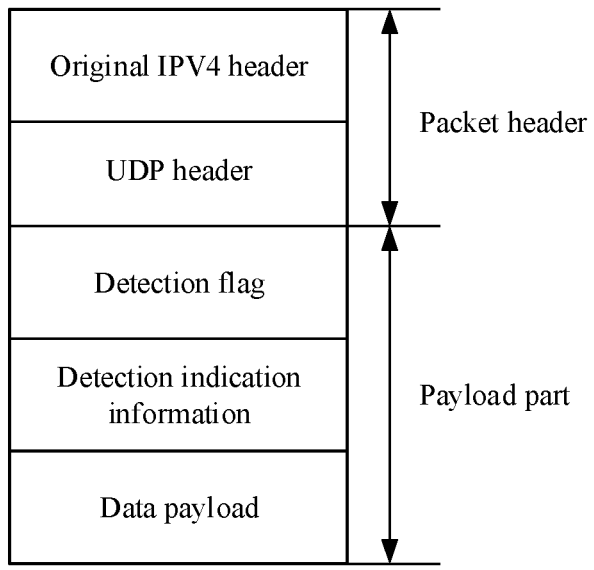
FIG. 6 is a schematic structural diagram of a packet encapsulation format according to an embodiment of this application.

For example, as shown in FIG. 6, when the encapsulation format of the packet is an internet protocol version 4 (IPV4) format, the detection flag and the detection indication information may be added above the data payload of the packet, and a part below a packet header is the payload part. An encapsulated packet header part may include a user datagram protocol (UDP)/TCP header and an original IPV4 header. An encapsulated payload part includes the detection flag, the detection indication information, and the data payload.

Implementation 2: The detection flag and the detection indication information are added to the packet header part of the packet.

Figure 7:
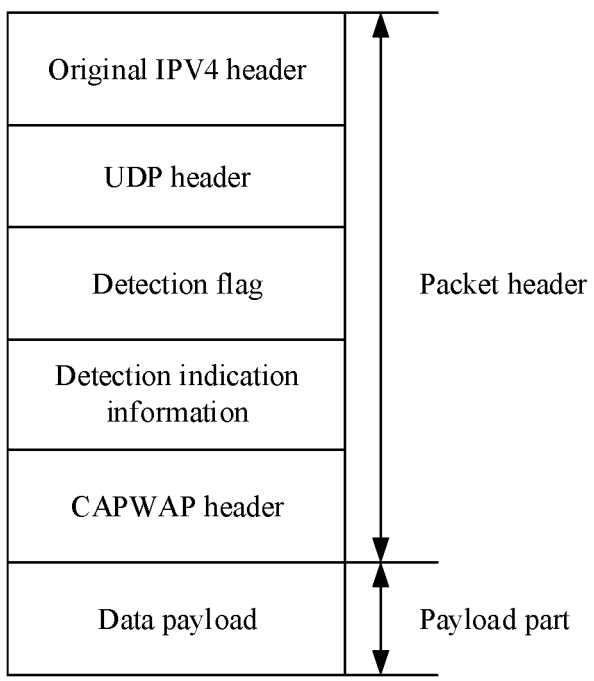
FIG. 7 is another schematic structural diagram of a packet encapsulation format according to an embodiment of this application.

For example, as shown in FIG. 7, when the encapsulation format of the packet is a control and provisioning of wireless access points protocol (CAPWAP) format, the detection flag and the detection indication information may be added above a CAPWAP header, and a part below the UDP header is the packet header part. The encapsulated payload part may include the data payload. The encapsulated packet header part may include the original IPV4 header, the UDP header, the detection flag, the detection indication information, and the CAPWAP header.

Figure 8:
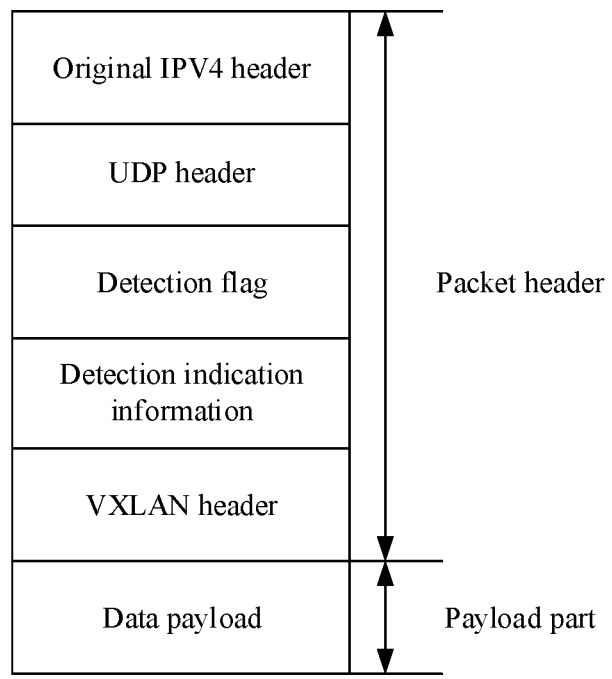
FIG. 8 is still another schematic structural diagram of a packet encapsulation format according to an embodiment of this application.

For example, as shown in FIG. 8, when the encapsulation format of the packet is a virtual extensible local area network (VXLAN) format, the detection flag and the detection indication information may be added above a VXLAN header, and the part below the UDP header is the packet header part. The encapsulated payload part may include the data payload. The encapsulated packet header part may include the original IPV4 header, the UDP header, the detection flag, the detection indication information, and the VXLAN header.

Implementation 3: The detection flag is added to the payload part of the packet, and the detection indication information is added to the packet header part of the packet.

Figure 9:
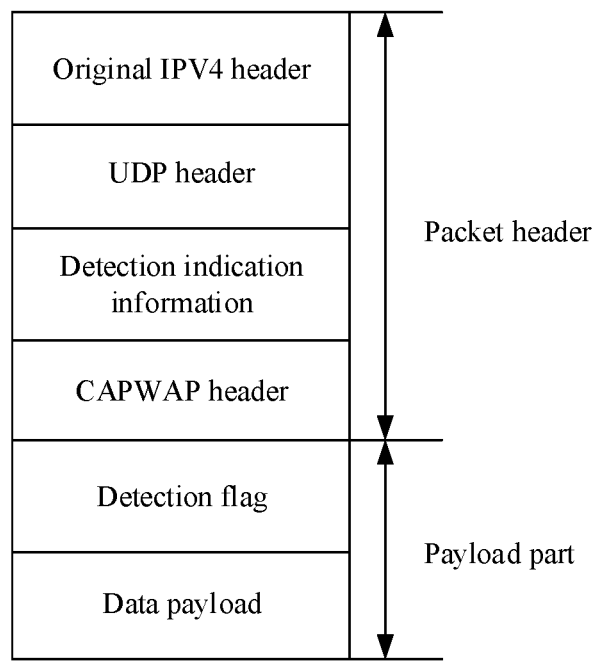
FIG. 9 is still another schematic structural diagram of a packet encapsulation format according to an embodiment of this application.

For example, as shown in FIG. 9, when the encapsulation format of the packet is the CAPWAP format, the detection flag may be added above the payload, and the part below the packet header is the payload part. The detection indication information is added above the CAPWAP header, and the part below the UDP header is the packet header part. The encapsulated payload part may include the detection flag and the data payload. The encapsulated packet header part may include the original IPV4 header, the UDP header, the detection indication information, and the CAPWAP header.

Implementation 4: The detection flag is added to the packet header part of the packet, and the detection indication information is added to the payload part.

Figure 10:
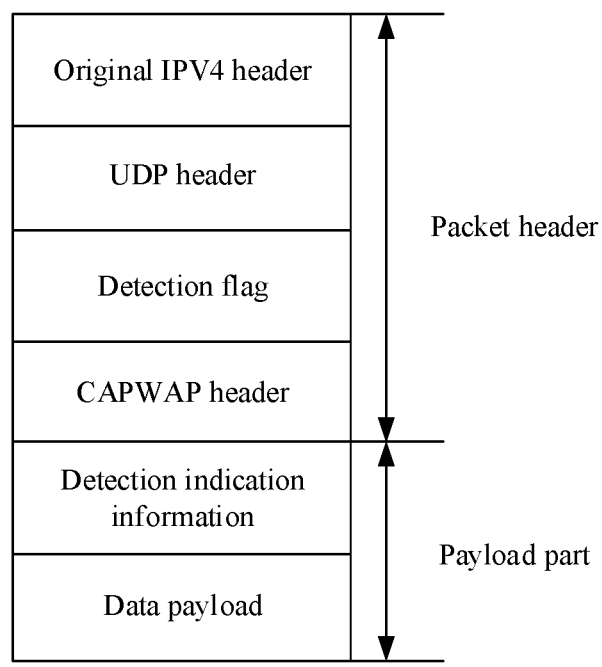
FIG. 10 is still another schematic structural diagram of a packet encapsulation format according to an embodiment of this application.

For example, as shown in FIG. 10, when the encapsulation format of the packet is the CAPWAP format, the detection flag may be added above the CAPWAP header, and the part below the UDP header is the packet header part. The detection indication information is added above the payload, and the part below the packet header is the payload part. The encapsulated payload part may include the detection indication information and the data payload. The encapsulated packet header part may include the original IPV4 header, the UDP header, the detection flag, and the CAPWAP header.

Specifically, in S501, the traffic to which the packet obtained by the first network device belongs may be to-be-detected traffic or not to-be-detected traffic. In S502, the first network device determines, based on whether there is information matching the traffic tuple information in an access control list (ACL), that the traffic to which the packet belongs is to-be-detected traffic or not to-be-detected traffic, and then performs S502 according to the following solution 1 or solution 2.

Solution 1: If the traffic to which the packet belongs is to-be-detected traffic, the first network device adds the detection flag and the detection indication information to the obtained packet in S501.

The user may configure a form and content of the detection indication information based on an actual requirement.

The content of the detection indication information may include but is not limited to the following four cases.

Case 1: The detection indication information may include a first flag and a second flag; or the detection indication information may include a first flag and a third flag; or the detection indication information may include a first flag, a second flag, and a third flag.

The first flag is used to indicate whether the traffic is to-be-detected traffic.

A form and content of the first flag are not uniquely limited in this application.

For example, the first flag may be one or more bits. When the one or more bits are a first value, it indicates that the traffic to which the packet including the first flag belongs is to-be-detected traffic. When the one or more flag bits are a second value, it indicates that the traffic to which the packet including the first flag belongs is not to-be-detected traffic.

A quantity of bits in the first flag, a specific value of the first value, and a specific value of the second value are not specifically limited in this application. For example, the first flag may be a flag bit, the first value may be 1, and the second value may be 0.

The second flag is used to indicate to collect packet quantity information of the traffic. The third flag is used to indicate to collect timestamp information of the packet.

Forms and content of the second flag and the third flag are not uniquely limited in this application.

For example, the second flag is configured as one bit. When the flag bit is set to 1, it indicates one measurement interval. When the flag bit is set to 0, it indicates another measurement interval. For another example, the third flag may also be a bit. When the bit is a third value, it indicates that the timestamp information of the packet is collected. When the bit is a fourth value, it indicates that the timestamp information of the packet is not collected. For example, the third value may be 1, and the fourth value may be 0.

When the detection indication information is the case 1, in the solution 1, the first network device sets the first flag in the detection indication information to the first value, periodically sets the second flag to 1 and 0, and sets the third flag to the third value.

Case 2: Based on the case 1, the detection indication information may further include a priority flag.

The priority flag is used to indicate a detection priority of the traffic to which the packet including the priority flag belongs.

A form and content of the priority flag are not uniquely limited in this application.

For example, the priority flag may be one identifier represented by one or more bits. In this case, an identifier value of the identifier may be used to indicate the detection priority of the to-be-detected traffic. For example, a higher priority of the traffic indicates a smaller identifier value represented by the priority flag. Alternatively, a higher priority of the traffic indicates a larger identifier value represented by the priority flag. For example, the priority flag may be represented by a 6-digit number, where 000000 may indicate a highest detection priority, and 111111 may indicate a lowest detection priority.

When the detection indication information is the case 2, in the solution 1, the first network device further needs to set a detection priority flag based on the detection priority of the traffic. For example, when the detection priority of the traffic is the highest, the priority flag is set to 000000.

Case 3: Based on the case 1 or the case 2, the detection indication information may include a backward flow flag and a tuple flag.

The backward flow flag is used to indicate whether to detect a backward flow, and the tuple flag is used to indicate to detect a backward flow that meets one or more tuple entries.

Forms and content of the backward flow flag and the tuple flag are not uniquely limited in this application.

For example, the backward flow flag may be configured as one or more bits. When the one or more bits are set to a fifth value, it indicates to detect the backward flow. When the one or more bits are set to a sixth value, it indicates not to detect the backward flow. For example, the backward flow flag may be configured as one bit, the fifth value may be set to 1, and the sixth value may be set to 0.

Specifically, the tuple flag may be configured as a plurality of bits. The plurality of bits are in a one-to-one correspondence with a plurality of tuple entries. One or more flag bits that are set in the plurality of bits are used to indicate the one or more tuple entries that the to-be-detected backward flow needs to meet. Specifically, a tuple entry determined by setting a flag bit may be used in the access control list (ACL) to determine, based on whether the tuple entry matches a corresponding tuple entry, whether a backward flow to which the packet belongs is the to-be-detected backward flow or not to-be-detected backward flow.

The one or more flag bits that are set may be set to 1 or 0.

When the detection indication information is the case 3, if a backward flow that meets one or more tuple entries needs to be detected, in the solution 1, the first network device sets the backward flow flag to the fifth value, sets a bit position of the one or more tuple entries in the tuple flag, to identify a tuple entry that needs to be concerned when the to-be-detected backward flow is determined, and not sets other bits of the tuple flag.

When the detection indication information is the case 3, if the backward flow does not need to be detected, in the solution 1, the first network device sets the backward flow flag to the sixth value, and sets the plurality of bits in the tuple flag to a default value or any value.

For example, it is assumed that the tuple entry includes a source IP address, a source port, a destination IP address, a destination port, and a transport layer protocol. The tuple flag correspondingly includes five flag bits: a flag bit 1 corresponding to the source IP address, a flag bit 2 corresponding to the source port, a flag bit 3 corresponding to the destination IP address, a flag bit 4 corresponding to the destination port, and a flag bit 5 corresponding to the transport layer protocol. It is assumed that the setting of the first network device is set to 1. When the backward flow needs to be detected and the to-be-detected backward flow needs to meet specified source port and destination port information, the first network device sets the backward flow flag to the fifth value (1), sets the flag bit 1 to 0, sets the flag bit 2 to 1, sets the flag bit 3 to 0, sets the flag bit 4 to 1, and sets the flag bit 5 to 0.

Case 4: Based on any one of the case 1 to the case 3, the detection indication information may include a packet loss cause report flag.

The packet loss cause report flag is used to indicate whether to report a packet loss cause.

A form and content of the packet loss cause report flag are not uniquely limited in this application.

For example, the packet loss cause report flag may be one or more bits. When the one or more bits are a seventh value, it indicates to report the packet loss cause. When the one or more bits are an eighth value, it indicates not to report the packet loss cause.

The user may configure a quantity of bits of the packet loss cause report flag based on an actual requirement, and configure the seventh value and the eighth value based on an actual requirement. This is not limited in this application.

For example, the packet loss cause report flag may be a flag bit, the seventh value is 1, and the eighth value is 0.

When the detection indication information is the case 4 and the packet loss cause is reported, the first network device in the solution 1 further needs to configure the packet loss cause report flag as the seventh value. When the detection indication information is the case 4 and the packet loss cause is not reported, the first network device in the solution 1 may further configure the packet loss cause report flag as the eighth value.

When the packet loss cause needs to be reported, the first network device configures the packet loss cause report flag as the fifth value. When the packet loss cause does not need to be reported, the first network device configures the packet loss cause report flag as the sixth value.

Optionally, the detection indication information may further include information such as a flow ID, a list file, a carried data flag, and a reserved bit. This is not listed one by one. The flow ID is used to uniquely indicate a flow. The carried data flag is used to indicate a data type carried in the list file. The list file is used to store file data indicated by the carried data flag. The reserved bit is used by the user for subsequent function extension.

It should be noted that the foregoing listed plurality of cases of the detection indication information are merely used as possible examples. It may be understood that the user may configure content of the detection indication information based on an actual requirement. This is not listed one by one.

Solution 2: If the traffic to which the packet belongs is not to-be-detected traffic, the first network device adds the detection flag and the detection indication information to the obtained packet in S501, and sets the first flag in the detection indication information as the second value.

In the solution 2, all other bits of the detection indication information in the packet may be set to a default value or any value.

S503: The first network device sends an updated packet to a second network device.

In a possible implementation, for a unicast communication manner, S503 may be implemented as follows: The first network device directly sends the updated packet to the second network device.

In another possible implementation, for a multicast communication manner, S503 may be implemented as follows: The first network device replicates a same quantity of copies of the updated packet as a quantity of the second network device that receives the packet, and sends the copies of the updated packet in a multicast manner.

For a packet obtained after that the packet belonging to the to-be-detected traffic is updated, perform related actions in S504 to S510 after S503.

S504: The second network device receives a first packet from the first network device.

The first packet is any packet of first traffic. The first packet may be the updated packet in S503.

In a possible implementation, the first traffic may be any to-be-detected traffic.

In another possible implementation, to be specific, when the detection indication information includes priority information, the first traffic may be, for example, traffic with a highest priority in undetected to-be-detected traffic.

S505: The second network device determines that the first packet includes the detection flag and determines that the first flag in first detection indication information that is after the detection flag indicates that the first traffic is to-be-detected traffic; and collects performance data of the first traffic on the second network device based on the first detection indication information S505 may be implemented as follows: The second network device obtains content in a detection flag position in the packet, and compares the content with a detection flag set by the user. If the content is consistent with the detection flag, determining that the detection flag exists in the packet, and then searching for a position of the detection indication information based on the detection flag, and further searching for content in a first flag position in the detection indication information. If the content in the first flag position is the first value, determining that the traffic is to-be-detected traffic. The traffic is referred to as the first traffic, the packet is referred to as the first packet, and the detection indication information is referred to as the first detection indication information.

Then, the second network device obtains whether the second flag and the third flag exist in the first detection indication information. If the second flag exists in the first detection indication information, the second network device collects, based on the second flag included in the first detection indication information in each packet in the first traffic, packet quantity information of the first traffic in the first network device. If the third flag exists in the first detection indication information, the second network device collects, based on the third flag included in the first detection indication information in each packet in the first traffic, timestamp information of each packet in the first traffic in the first network device. The second network device uses the collected packet quantity information and/or timestamp information as performance data.

According to the traffic detection method provided in this application, when performance information of the traffic is detected, the detection flag and the detection indication information are added to the packet of the traffic, and a position of the detection indication information is specifically indicated by using the detection flag. Therefore, the detection indication information is added to any position segment (for example, the any position segment may be a packet header segment, a payload segment, or a segment between a packet header and a payload) in the packet. This improves flexibility and extensiveness of traffic performance detection.

Figure 11A:
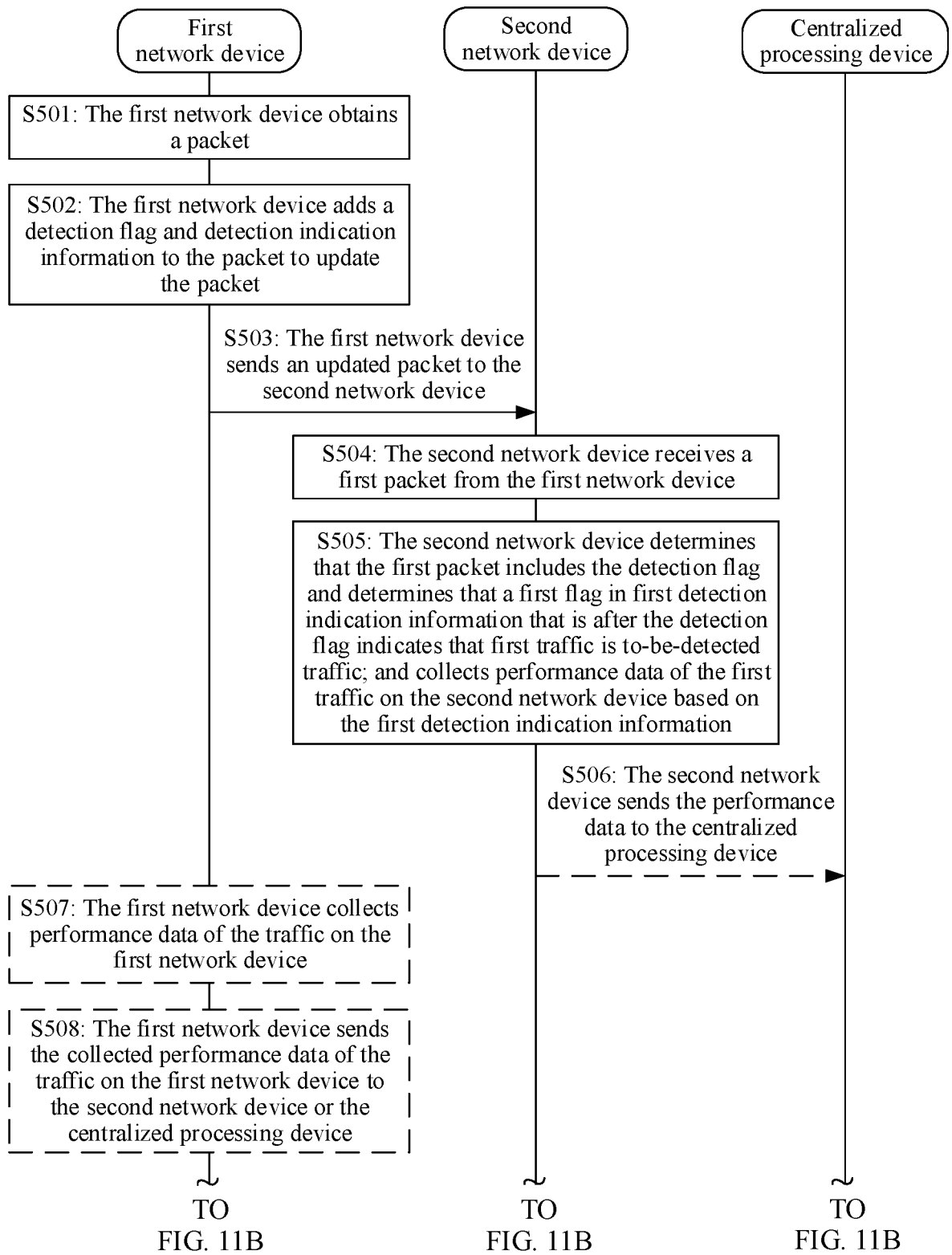
FIG. 11A and FIG. 11B are another schematic flowchart of a traffic detection method according to an embodiment of this application.
Figure 11B:
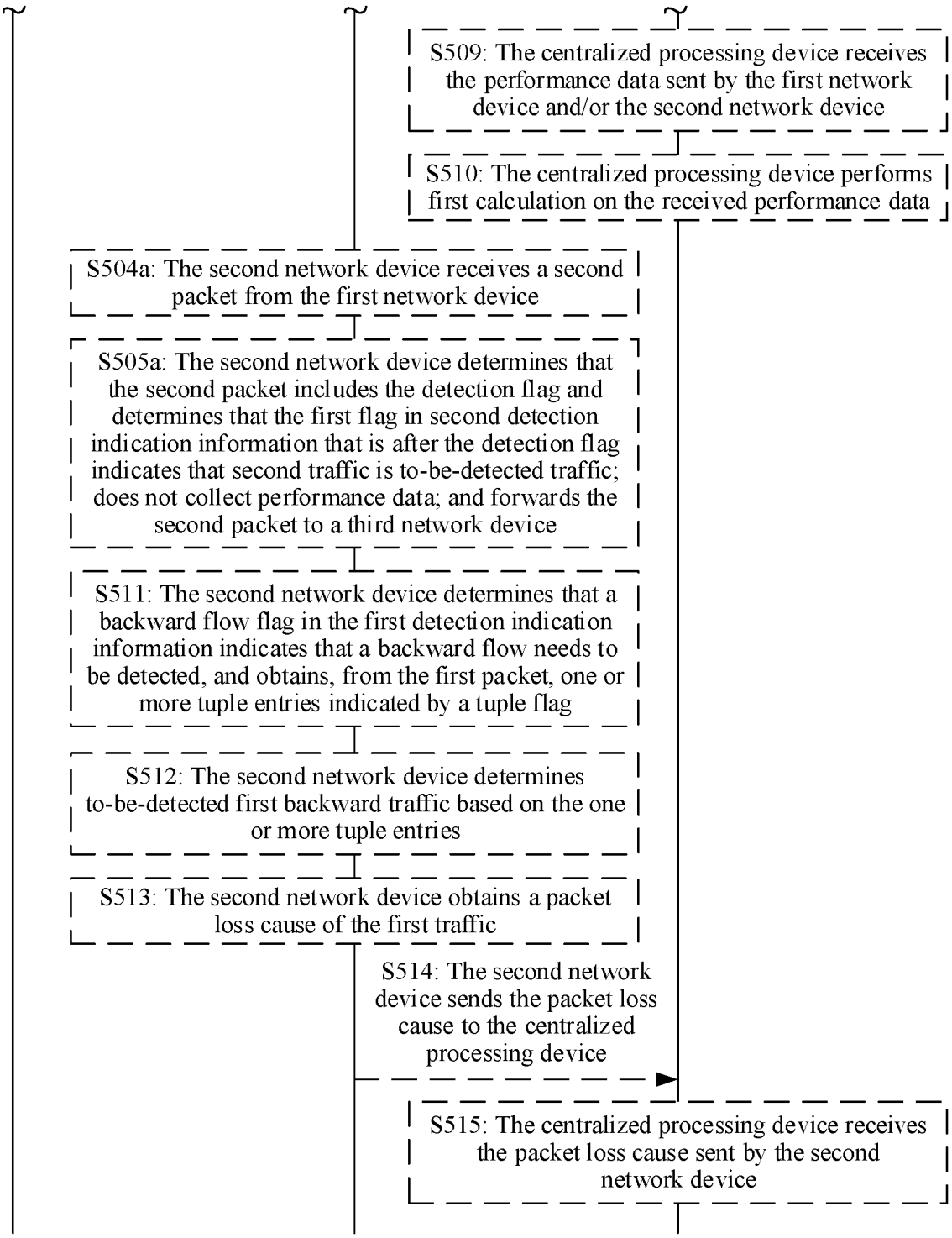

Further, as shown in FIG. 11A and FIG. 11B, the traffic detection method provided in this application may further include the following S506 to S510.

S506: The second network device sends the performance data to a centralized processing device.

In a possible implementation, the second network device adds the collected performance data of the traffic on the second network device to the reserved bit or the list file of the detection indication information, and sends the reserved bit or the list file to the centralized processing device.

In another possible implementation, the second network device periodically sends the collected performance data of the traffic on the second network device to the centralized processing device by using a protocol packet.

The user may configure a sending period based on an actual requirement. This is not limited in this application.

Optionally, when the performance data is sent, auxiliary information may be further sent. The auxiliary information may include: a flow ID, a sequence number of the packet, and the like.

S507: The first network device collects performance data of the traffic on the first network device.

The performance data may include one or more pieces of the following data: packet quantity information of the traffic collected based on the second flag, and timestamp information of the packet collected based on the third flag.

The first network device collects the performance data of the traffic on the first network device based on the detection indication information.

For example, S507 may be implemented as follows: collect the packet quantity information of the traffic in the first network device based on the second flag included in the detection indication information in each packet; and collect the timestamp information of each packet in the traffic in the first network device based on the third flag included in the detection indication information in each packet.

S508: The first network device sends the collected performance data of the traffic on the first network device to the second network device or the centralized processing device.

Specifically, for implementation of S508, refer to S506. Details are not described again.

S509: The centralized processing device receives the performance data sent by the first network device and/or the second network device.

The centralized processing device receives the performance data sent by the first network device and/or the second network device, namely, the performance data sent in S506 and/or S508.

S510: The centralized processing device performs first calculation on the received performance data.

The first calculation may include one or more of the following: packet loss calculation, delay calculation, jitter calculation, and out-of-order calculation.

Specifically, the packet loss calculation may include calculation of a total quantity of lost packets of the first traffic. The calculation of the total quantity of lost packets of the first traffic refers to a quantity of lost packets of the first traffic from a source node to a destination node. Optionally, the centralized processing device may further calculate a quantity of lost packets of the first traffic between any two nodes on a transmission path. Further, the centralized processing device may perform fault demarcation and the like based on whether a packet loss occurs between nodes.

The delay calculation may include: First, a delay of each packet from the source node to the destination node in the first traffic is obtained through calculation. Then, statistics about an average value of delays of all packets in the first traffic from the source node to the destination node is collected. Delays of all packets in the first traffic from the source node to the destination node are compared, to obtain a maximum delay and a minimum delay from the source node to the destination node in the first traffic. Then, any one of the average delay, the maximum delay, or the minimum delay is used as the delay of the first traffic.

Optionally, the centralized processing device may further obtain, through calculation, a delay of each packet in the first traffic between any two nodes. Further, the centralized processing device may perform fault demarcation and the like based on delay information between nodes.

The jitter calculation may be implemented as follows: The centralized processing device obtains receiving timestamps of each packet in the first traffic on all nodes, converts the receiving timestamps into receiving times, and calculates a receiving time interval between every two packets in the first traffic on each node. If a receiving time interval between two packets on a node is greater than a first threshold, it is considered that jitter occurs on the node. If a receiving time interval between two packets on a node is not greater than the first threshold, it is considered that no jitter occurs on the node. Further, the centralized processing device may perform fault demarcation and the like based on whether jitter occurs between nodes.

The first threshold may be configured based on an actual requirement. This is not specifically limited in this application.

The out-of-order calculation may be implemented as follows: The centralized processing device obtains a receiving timestamp and a sequence number of each packet in the first traffic. The centralized processing device sorts the packets based on the receiving timestamp and the sequence number of each packet in the first traffic. If there is no intersection between the receiving time and the sequence number, it is considered that no out-of-order packets exist. If there is an intersection between the receiving time and the sequence number, it is considered that out-of-order packets exist. In addition, out-of-order packets and out-of-order nodes can be obtained. Further, the centralized processing device may perform fault demarcation and the like based on the obtained out-of-order packets and out-of-order nodes.

Optionally, if the second network device has a related processing capability of the centralized processing device, the second network device may replace the centralized processing device to perform related processing.

It should be noted that, for an updated packet in the not to-be-detected traffic, as shown in FIG. 11A and FIG. 11B, S504a and S505a are performed after S503.

S504a: The second network device receives a second packet from the first network device.

The second packet is any packet of second traffic. The second traffic may be any not to-be-detected traffic.

S505a: The second network device determines that the second packet includes the detection flag and determines that a first flag in second detection indication information that is after the detection flag indicates that the second traffic is not to-be-detected traffic; does not collect performance data; and forwards the second packet to a third network device.

The third network device may be a next-hop network device of the second network device, or any network device that is located behind the second network device and that is on a second packet transmission path.

Specifically, S505a may be implemented as follows: The second network device obtains digital content in the detection flag position in the packet, and compares the digital content with content of the detection flag set by the user. If the content is consistent with the content of the detection flag, determining that the detection flag exists in the packet, and searching for content in the first flag position in the detection indication information based on the detection flag. If the content in the first flag position is the second value, determining that the traffic is not to-be-detected traffic. The traffic is referred to as the second traffic, the packet is referred to as the second packet, and the detection indication information is referred to as the second detection indication information. Then, the second network device does not collect the performance data, and forwards the second packet to the third network device (when the second network device is an intermediate node). Alternatively, the second network device does not collect the performance data, and pops up the detection flag and the detection indication information in the packet (when the second network device is the destination node).

After S505 or S505a is performed, the traffic detection method provided in this application may further include: When the second network device is an intermediate node on a first traffic path, the second network device forwards the first packet. When the second network device is a destination node on the first traffic path, the second network device pops out the detection flag and the first detection indication information that are in the first packet.

When the first detection indication information is the foregoing case 3, as shown in FIG. 11B, the traffic detection method provided in this application may further include S511 and S512. The second network device that performs S511 and S512 may be the destination node on the first traffic path.

S511: The second network device determines that the backward flow flag in the first detection indication information indicates that the backward flow needs to be detected, and obtains, from the first packet, the one or more tuple entries indicated by the tuple flag.

Specifically, S511 may be implemented as follows: The second network device obtains content of the backward flow flag based on the position of the backward flow flag in the first detection indication information. If the backward flow flag indicates to detect the backward flow, the second network device searches for content of the plurality of flag bits in the tuple flag, to find flag bits that are set in the plurality of flag bits, and the second network device obtains, from the first packet, a tuple entry corresponding to one or more flag bits that are set in the plurality of flag bits.

S512: The second network device determines to-be-detected first backward flow based on the one or more tuple entries.

Specifically, S512 may be implemented as follows: The second network device obtains tuple information of multiple pieces of traffic, matches the tuple information of the multiple pieces of traffic with tuple entries obtained in S511 and corresponding to the one or more flag bits that are set in the plurality of flag bits, and determines that traffic meeting the tuple entries corresponding to the one or more flag bits is the to-be-detected first backward flow It should be noted that, if the backward flow flag indicates that the backward flow does not need to be detected, S511 and S512 are not performed.

Further, as shown in FIG. 11B, the traffic detection method provided in this application may further include S513 to S515.

S513: The second network device obtains a packet loss cause of the first traffic.

For example, the second network device may perform security check or routing information check to determine whether packet loss occurs during forwarding, packet loss occurs due to incorrect routing information, or the like.

Optionally, each second network device on a path through which the first traffic passes may perform S513 once.

If an obtaining result in S513 is empty, S514 is not performed. If the second network device obtains one or more packet loss causes of the first traffic in S513, S514 is performed.

S514: The second network device sends the packet loss cause to the centralized processing device.

In a possible implementation, after S513 is performed, the second network device directly sends the packet loss cause obtained in S513 to the centralized processing device.

In another possible implementation, the first detection indication information further includes the packet loss cause report flag, and S514 may be implemented as follows: The second network device searches for a position of the packet loss cause report flag in the first detection indication information, to obtain content of a packet loss report flag. If the packet loss report cause flag indicates to report the packet loss cause, the second network device periodically sends the packet loss cause obtained in S513 to the centralized processing device by using a flow table or a protocol packet.

For example, the second network device periodically sends the packet loss cause obtained in S513 to the centralized processing device directly by using the flow table or the protocol packet.

For another example, the second network device numbers packet loss causes obtained in S513, and then periodically sends the numbers corresponding to the packet loss causes to the centralized processing device by using the flow table or the protocol packet.

The user may configure a packet loss cause report periodicity based on an actual requirement. This is not specifically limited in this application.

S515: The centralized processing device receives the packet loss cause sent by the second network device.

The centralized processing device receives the packet loss cause sent by the second network device, namely, the packet loss cause sent by the second network device in S514.

The foregoing mainly describes the solutions provided in the embodiments of the present disclosure from a perspective of interaction between the first network device and the second network device in the traffic detection system. It may be understood that, to implement the foregoing functions, the traffic detection apparatuses such as the first network device and the second network device include corresponding hardware structures and/or software modules for performing the functions. A person of ordinary skill in the art should easily be aware that, in combination with the example units and algorithm steps described in the embodiments disclosed in this specification, the present disclosure can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In the embodiments of the present disclosure, function module division may be performed on the traffic detection apparatus according to the foregoing method example. For example, function modules may be obtained through division in correspondence with functions, or two or more functions may be integrated into one processing module. The integrated module may be implemented in a form of hardware, or may be implemented in a form of a software function module. It should be noted that, in the embodiments of the present disclosure, module division is an example, and is merely a logical function division. In actual implementation, another division manner may be used.

Figure 12:
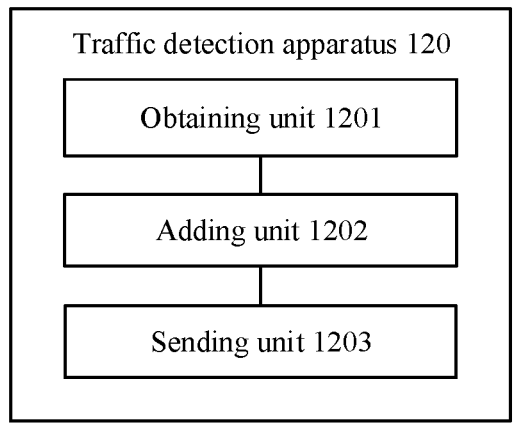
FIG. 12 is a schematic structural diagram of a traffic detection apparatus according to an embodiment of this application.

When function modules are obtained through division in correspondence with functions, FIG. 12 shows a traffic detection apparatus 120 according to the embodiments of this application. The traffic detection apparatus 120 is configured to implement a function of the first network device in the foregoing embodiments. The traffic detection apparatus 120 may be a first network device, or the traffic detection apparatus 120 may be deployed on a first network device. As shown in FIG. 12, the traffic detection apparatus 120 may include an obtaining unit 1201, an adding unit 1202, and a sending unit 1203. The obtaining unit 1201 is configured to perform S501 in FIG. 5 or FIG. 11A. The adding unit 1202 is configured to perform S502 in FIG. 5 or FIG. 11A. The sending unit 1203 is configured to perform S503 in FIG. 5 or FIG. 11A. All related content of the steps in the foregoing method embodiments may be cited in function descriptions of a corresponding function module. Details are not described herein again.

Figure 13:
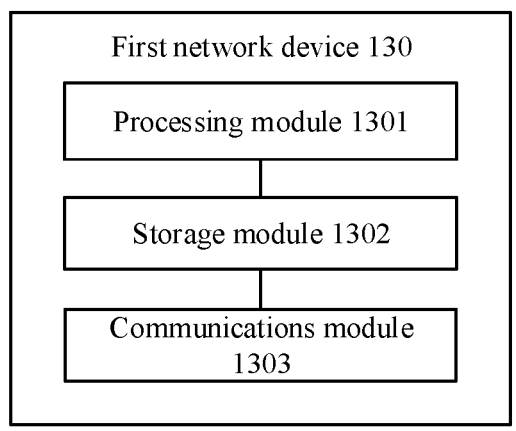
FIG. 13 is a schematic structural diagram of a first network device according to an embodiment of this application.

When an integrated unit is used, FIG. 13 shows a first network device 130 provided in the embodiments of this application. The first network device 130 is configured to implement a function of the first network device in the foregoing method. The first network device 130 includes at least one processing module 1301, configured to implement a function of the first network device in the embodiments of this application. For example, the processing module 1301 may be configured to perform the processes S501 and S502 in FIG. 5, or the processes S501, S502, S507, and S508 in FIG. 11A and FIG. 11B. For details, refer to the detailed descriptions in the method example. Details are not described herein again.

The first network device 130 may further include at least one storage module 1302, configured to store program instructions and/or data. The storage module 1302 is coupled to the processing module 1301. The coupling in this embodiment of this application may be indirect coupling or a communication connection between apparatuses, units, or modules in an electrical form, a mechanical form, or another form, and is used for information exchange between the apparatuses, the units, or the modules. The processing module 1301 may cooperate with the storage module 1302. The processing module 1301 may execute the program instructions stored in the storage module 1302. At least one of the at least one storage module may be included in the processing module.

The first network device 130 may further include a communications module 1303, configured to communicate with another device by using a transmission medium, so as to be configured to determine that the first network device 130 can communicate with another device. The communications module 1303 is configured to let the device to communicate with another device. For example, the processor 1301 may use the communications module 1303 to perform the process S503 in FIG. 5 or FIG. 11A.

When the processing module 1301 is a processor, the storage module 1302 is a memory, and the communications module 1303 is a transceiver, the first network device 130 in FIG. 13 according to the embodiments of this application may be the network device 40 shown in FIG. 4.

As described above, the traffic detection apparatus 120 or the first network device 130 provided in the embodiments of this application may be configured to implement functions of the first network device in the methods implemented in the foregoing embodiments of this application. For ease of description, only a part related to the embodiments of this application is shown. For specific technical details that are not disclosed, refer to the embodiments of this application.

Figure 14:
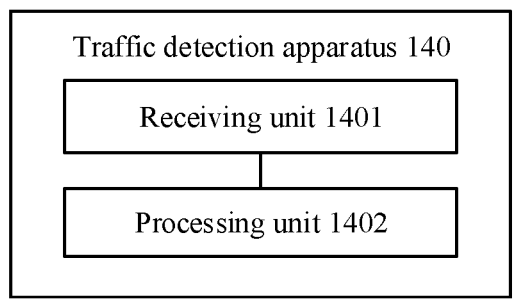
FIG. 14 is another schematic structural diagram of a traffic detection apparatus according to an embodiment of this application.

When function modules are obtained through division in correspondence with functions, FIG. 14 shows a traffic detection apparatus 140 according to the embodiments of this application. The traffic detection apparatus 140 is configured to implement a function of the second network device in the foregoing embodiments. The traffic detection apparatus 140 may be a second network device, or the traffic detection apparatus 140 may be deployed on a second network device. As shown in FIG. 14, the traffic detection apparatus 140 may include a receiving unit 1401, and a processing unit 1402. The receiving unit 1401 is configured to perform S504 and S504a in FIG. 5 or FIG. 11A and FIG. 11B. The processing unit 1402 is configured to perform S505 and S505a in FIG. 5 or FIG. 11A and FIG. 11B. All related content of the steps involved in the foregoing method embodiments may be cited in function descriptions of corresponding function modules. Details are not described herein again.

Figure 15:
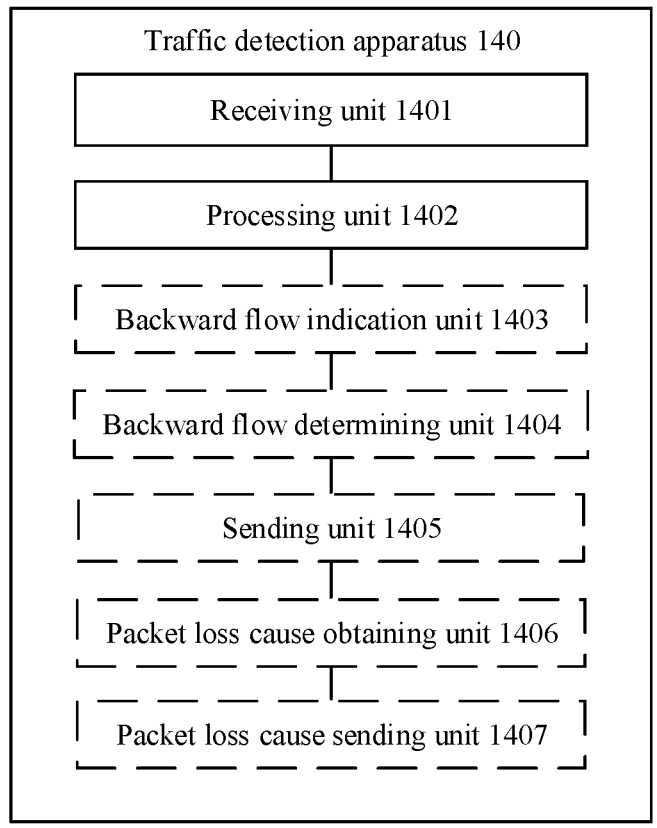
FIG. 15 is still another schematic structural diagram of a traffic detection apparatus according to an embodiment of this application.

Further, as shown in FIG. 15, the traffic detection apparatus 140 may further include a backward flow indication unit 1403, a backward flow determining unit 1404, a sending unit 1405, a packet loss cause obtaining unit 1406, and a packet loss cause sending unit 1407. The backward flow indication unit 1403 is configured to perform S511 in FIG. 11B. The backward flow determining unit 1404 is configured to perform S512 in FIG. 11B. The sending unit 1404 is configured to perform S506 in FIG. 11A. The packet loss cause obtaining unit 1406 is configured to perform S513 in FIG. 11B. The packet loss cause sending unit 1407 is configured to perform S514 in FIG. 11B. All related content of the steps in the foregoing method embodiments may be cited in function descriptions of corresponding function modules. Details are not described herein again.

Figure 16:
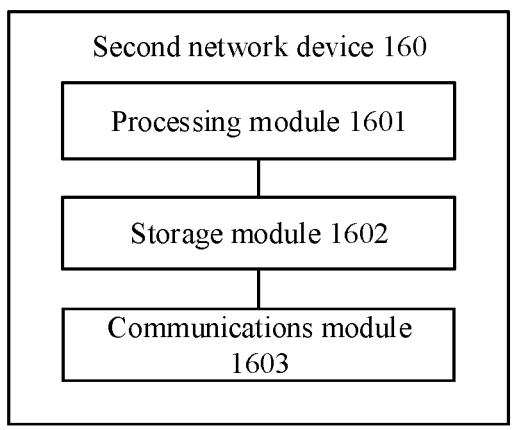
FIG. 16 is a schematic structural diagram of a second network device according to an embodiment of this application.

When an integrated unit is used, FIG. 16 shows a second network device 160 provided in the embodiments of this application. The second network device 160 is configured to implement a function of the second network device in the foregoing embodiments. The second network device 160 may include at least one processing module 1601, configured to implement a function of the second network device in the embodiments of this application. For details, refer to detailed descriptions in the method example. Details are not described herein again.

The second network device 160 may further include at least one storage module 1602, configured to store program instructions and/or data. The storage module 1602 is coupled to the processing module 1601. The coupling in this embodiment of this application may be indirect coupling or a communication connection between apparatuses, units, or modules in an electrical form, a mechanical form, or another form, and is used for information exchange between the apparatuses, the units, or the modules. The processing module 1601 may cooperate with the storage module 1602. The processing module 1601 may execute the program instructions stored in the storage module 1602. At least one of the at least one storage module may be included in the processing module.

The second network device 160 may further include a communications module 1603, configured to communicate with another device by using a transmission medium, so as to be configured to determine that the second network device 160 can communicate with another device. The communications module 1603 is configured to let the device to communicate with another device. For example, the processor 1601 may use the communications module 1603 to perform S504, S504a, S505, S505a, S511, S512 and S513 in FIG. 5 or FIG. 11A and FIG. 11B.

When the processing module 1601 is a processor, the storage module 1602 is a memory, and the communications module 1603 is a transceiver, the second network device 160 in FIG. 16 according to the embodiments of this application may be the network device 40 shown in FIG. 4.

As described above, the traffic detection apparatus 140 or the second network device 160 provided in the embodiments of this application may be configured to implement functions of the second network device in the foregoing embodiments of this application. For ease of description, only a part related to the embodiments of this application is shown. For specific technical details that are not disclosed, refer to the embodiments of this application.

According to other embodiments of this application, a traffic detection system is provided. The traffic detection system may include a first traffic detection apparatus and a second traffic detection apparatus. The first traffic detection apparatus may implement a function of the first network device in the foregoing embodiments, and the second traffic detection apparatus may implement a function of the second network device. For example, the first traffic detection apparatus may be the first network device described in the embodiments of this application, and the second traffic detection apparatus may be the second network device described in the embodiments of this application.

According to other embodiments of this application, a chip system is provided. The chip system includes a processor, may further include a memory, and is configured to implement functions of the first network device in the embodiments shown in FIG. 5 or FIG. 11A and FIG. 11B. The chip system may include a chip, or may include a chip and another discrete component.

According to other embodiments of this application, a chip system is provided. The chip system includes a processor, may further include a memory, and is configured to implement functions of the second network device in the embodiments shown in FIG. 5 or FIG. 11A and FIG. 11B. The chip system may include a chip, or may include a chip and another discrete component.

According to other embodiments of this application, a computer-readable storage medium is further provided. The computer-readable storage medium may include a computer program. When the computer program is run on a computer, the computer is enabled to perform the steps in the embodiments shown in FIG. 5 or FIG. 11A and FIG. 11B.

According to other embodiments of this application, a computer program product is further provided. The computer product includes a computer program. When the computer program product is run on a computer, the computer is enabled to perform the steps in the embodiments shown in FIG. 5 or FIG. 11A and FIG. 11B.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented based on a requirement, in other words, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A traffic detection method, comprising:
obtaining, by a first network device, a packet of traffic on a network;
adding, by the first network device, a detection flag and detection indication information to the packet to update the packet to an updated packet, wherein the detection flag indicates a position of the detection indication information, wherein the detection indication information comprises a first flag and a priority flag, wherein the first flag indicates whether the traffic is to-be-detected traffic, and the priority flag is used to indicate a detection priority of the traffic; and
sending, by the first network device, the updated packet to a second network device.

2. The method according to claim 1, wherein the adding the detection flag and the detection indication information to the packet comprises:
determining, based on an access control list, that the traffic is to-be-detected traffic; and
adding the detection flag and the detection indication information to the packet, wherein the first flag in the detection indication information is a first value.

3. The method according to claim 1, wherein the detection indication information further comprises at least one of the following: a second flag used to indicate to collect packet quantity information of the traffic, and a third flag used to indicate to collect timestamp information of the packet.

4. The method according to claim 1, wherein the detection indication information further comprises a backward flow flag and a tuple flag, wherein the backward flow flag is used to indicate whether to detect a backward flow, and the tuple flag is used to indicate to detect a backward flow that meets one or more tuple entries.

5. The method according to claim 4, wherein the tuple flag comprises a plurality of flag bits, the plurality of flag bits are in a one-to-one correspondence with a plurality of tuple entries, and one or more flag bits that are set in the plurality of flag bits are used to indicate the one or more tuple entries that the to-be-detected backward flow meets.

6. The method according to claim 1, wherein the adding the detection flag and the detection indication information to the packet comprises:
  determining, based on an access control list, that the traffic is not to-be-detected traffic; and
  adding the detection flag and the detection indication information to the packet, wherein the first flag in the detection indication information is a second value.

7. A first network device, wherein the first network device comprises a processor and a memory,
  wherein the memory is connected to the processor, and the memory is configured to store computer instructions, such that when the processor executes the computer instructions, the first network device performs the traffic detection method according to claim 1.

8. A traffic detection method, comprising:
  receiving, by a second network device, a first packet from a first network device, wherein the first packet is a packet of first traffic on a network, wherein the first packet comprises a detection flag and first detection indication information;
  determining, by the second network device, that a first flag in the first detection indication information that is after the detection flag indicates that the first traffic is to-be-detected traffic; and
  collecting, by the second network device, performance data of the first traffic on the second network device based on the first detection indication information, wherein a value of the first flag in the first detection indication information is a first value, and wherein the first detection indication information further comprises a priority flag that is used to indicate a detection priority of the first traffic.

9. The method according to claim 8, wherein
  the first detection indication information comprises at least one of the following: a second flag used to indicate to collect packet quantity information of the first traffic, and a third flag used to indicate to collect timestamp information of the first packet; and
  the performance data comprises at least one of the following data: the packet quantity information of the first traffic collected based on the second flag, and the timestamp information of the first packet collected based on the third flag.

10. The method according to claim 8, wherein the first detection indication information further comprises a backward flow flag and a tuple flag, wherein the backward flow flag is used to indicate whether to detect a backward flow, and the tuple flag is used to indicate to detect a backward flow that meets one or more tuple entries; and the method further comprises:
  determining that the backward flow flag in the first detection indication information indicates to detect the backward flow, and obtaining, from the first packet, the one or more tuple entries indicated by the tuple flag; and
  determining a to-be-detected first backward flow based on the one or more tuple entries.

11. The method according to claim 10, wherein the tuple flag comprises a plurality of flag bits, the plurality of flag bits are in a one-to-one correspondence with a plurality of tuple entries, and one or more flag bits that are set in the plurality of flag bits are used to indicate the one or more tuple entries that the to-be-detected backward flow meets; and the obtaining, from the first packet, the one or more tuple entries indicated by the tuple flag comprises:
  obtaining, based on the one or more flag bits that are set in the plurality of flag bits, the one or more tuple entries that the to-be-detected first backward flow meets.

12. The method according to claim 8, wherein after the collecting the performance data of the first traffic on the second network device, the method further comprises:
  sending the performance data to a centralized processing device.

13. The method according to claim 12, wherein the method further comprises:
  obtaining a packet loss cause of the first traffic, and
  sending the packet loss cause to the centralized processing device.

14. The method according to claim 8, wherein the method further comprises:
  receiving a second packet from the first network device, wherein the second packet is a packet of second traffic on the network, wherein the second packet comprises a second detection flag and second detection indication information;
  determining that a second flag in the second detection indication information that is after the second detection flag indicates that the second traffic is not to-be-detected traffic;
  skipping collecting performance data of the second traffic; and
  forwarding the second packet to a third network device, wherein a value of the second flag in the second detection indication information is a second value.

15. A second network device, wherein the second network device comprises a processor and a memory,
  wherein the memory is connected to the processor, and the memory is configured to store computer instructions, such that when the processor executes the computer instructions, the second network device performs the traffic detection method according to claim 8.

* * * * *